United States Patent [19]

Klope

[11] Patent Number: 5,577,787
[45] Date of Patent: Nov. 26, 1996

[54] SAFETY HOOK AND METHOD

[75] Inventor: Robert K. Klope, West Paducah, Ky.

[73] Assignee: Ingersoll-Rand Company, Woodcliff Lake, N.J.

[21] Appl. No.: 557,894

[22] Filed: Nov. 14, 1995

[51] Int. Cl.$^6$ ............................................. B66C 1/36
[52] U.S. Cl. .................. 294/82.19; 24/599.5; 24/600.1
[58] Field of Search .................... 294/82.17, 82.19, 294/82.2, 82.21; 24/599.1, 599.4–599.9, 600.1, 600.2

[56] References Cited

U.S. PATENT DOCUMENTS

| | | |
|---|---|---|
| 443,630 | 12/1890 | Adams . |
| 501,875 | 7/1893 | Cutter . |
| 779,972 | 1/1905 | Rowland et al. . |
| 1,209,615 | 12/1916 | Obsboum . |
| 1,457,648 | 6/1923 | Bailey ................................. 294/82.19 |
| 1,508,308 | 9/1924 | Thompson . |
| 1,517,019 | 11/1924 | Serl ..................................... 294/82.21 |
| 1,524,761 | 2/1925 | Timbs ................................. 294/82.19 |
| 1,524,844 | 2/1925 | Scott et al. . |
| 1,790,056 | 1/1931 | Moody . |
| 1,985,596 | 12/1934 | Burnham ............................. 294/82.2 |
| 3,008,210 | 11/1961 | Stovern ............................... 294/82.19 |
| 4,050,730 | 9/1977 | Tada et al. .......................... 294/82.2 |
| 4,621,851 | 11/1986 | Bailey ................................. 294/82.2 |
| 5,005,266 | 4/1991 | Fister et al. . |

FOREIGN PATENT DOCUMENTS

| | | | |
|---|---|---|---|
| 2425867 | 12/1974 | Germany .......................... 294/82.2 |
| 64883 | 3/1994 | Japan ................................ 294/82.2 |
| 389954 | 3/1933 | United Kingdom ............... 294/82.2 |
| 1527238 | 10/1978 | United Kingdom ............... 294/82.2 |

*Primary Examiner*—Johnny D. Cherry
*Attorney, Agent, or Firm*—Michael M. Gnibus

[57] ABSTRACT

A safety hook, that includes a hook with a hook end and a latch member with a first end that is pivotably connected to the hook and a second free end. The latch member is pivotable about the first end between a first position where the second end is located away from the hook end and a second position where the second end is located at the hook end. The safety hook also includes a biasing spring for biasing the latch member to the second position. Additionally, the safety hook includes a retainer member mounted on the latch. The retainer member keeps the latch in the first position and prevents the latch from moving to the second position.

12 Claims, 3 Drawing Sheets

SAFETY HOOK AND METHOD

FIELD OF THE INVENTION

This invention generally relates to safety hooks and more particularly to an improved safety hook having a latch with a retaining member attached to the latch.

DESCRIPTION OF THE PRIOR ART

Safety hooks for supporting heavy loads typically include a hook body which defines a hook recess that is adapted to receive the free end of a load supporting rope or chain. Conventional safety hooks include a pivotable latch member that is spring biased to a closed position in order to keep the rope or chain supporting the load from falling off the hook. When the latch is in the closed position, the free end of the latch engages the hook body. In order to remove the rope or chain from the hook recess of a conventional safety hook, a machine operator must manually pivot the spring biased latch out of contact with the hook, then hold the latch out of the closed position and simultaneously try to take the rope or chain out of the hook recess.

Simultaneously holding the latch and taking the rope out of the hook recess can be difficult. Because the biasing spring is usually quite stiff, in order to hold the latch open it may be necessary for the operator to hold the latch with both hands. If both of the operator's hands are occupied holding the latch, a second operator will be needed to remove the rope or chain from the hook.

Additionally, the load supporting chain can be quite heavy. In order to remove the chain from the hook the operator may have to lift the chain with both hands leaving no way to hold the latch open, making removal of the chain with one operator impossible.

Ideally, the load supporting member should be able to be removed from the safety hook by the machine operator working alone. When the help of an additional operator is required in order to remove the rope or chain from the hook, the second operator is required to abandon his or her primary job or duty causing the additional operator to waste time and making the additional operator perform his or her primary job or duty less efficiently.

The foregoing illustrates limitations known to exist in present devices and methods. Thus, it is apparent that it would be advantageous to provide an alternative safety hook which could maintain a hook latch in an open position when it is necessary to remove a chain or rope from the hook so that the operator is free to use both hands to take the rope or chain off the hook, so the operator can remove the chain or rope working alone. Accordingly, a suitable alternative is provided including features more fully disclosed hereinafter.

SUMMARY OF THE INVENTION

In one aspect of the present invention, this is accomplished by providing a safety hook including a hook having a hook end; a latch member having a first end pivotably connected to the hook and a second free end, the latch member pivotable about the first end between a first position where the second end is located away from the hook end and a second position where the second end is located at the hook end; biasing means for biasing the latch member to the second position; and retainer means mounted on the latch, the retainer means for maintaining the latch in the first position.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
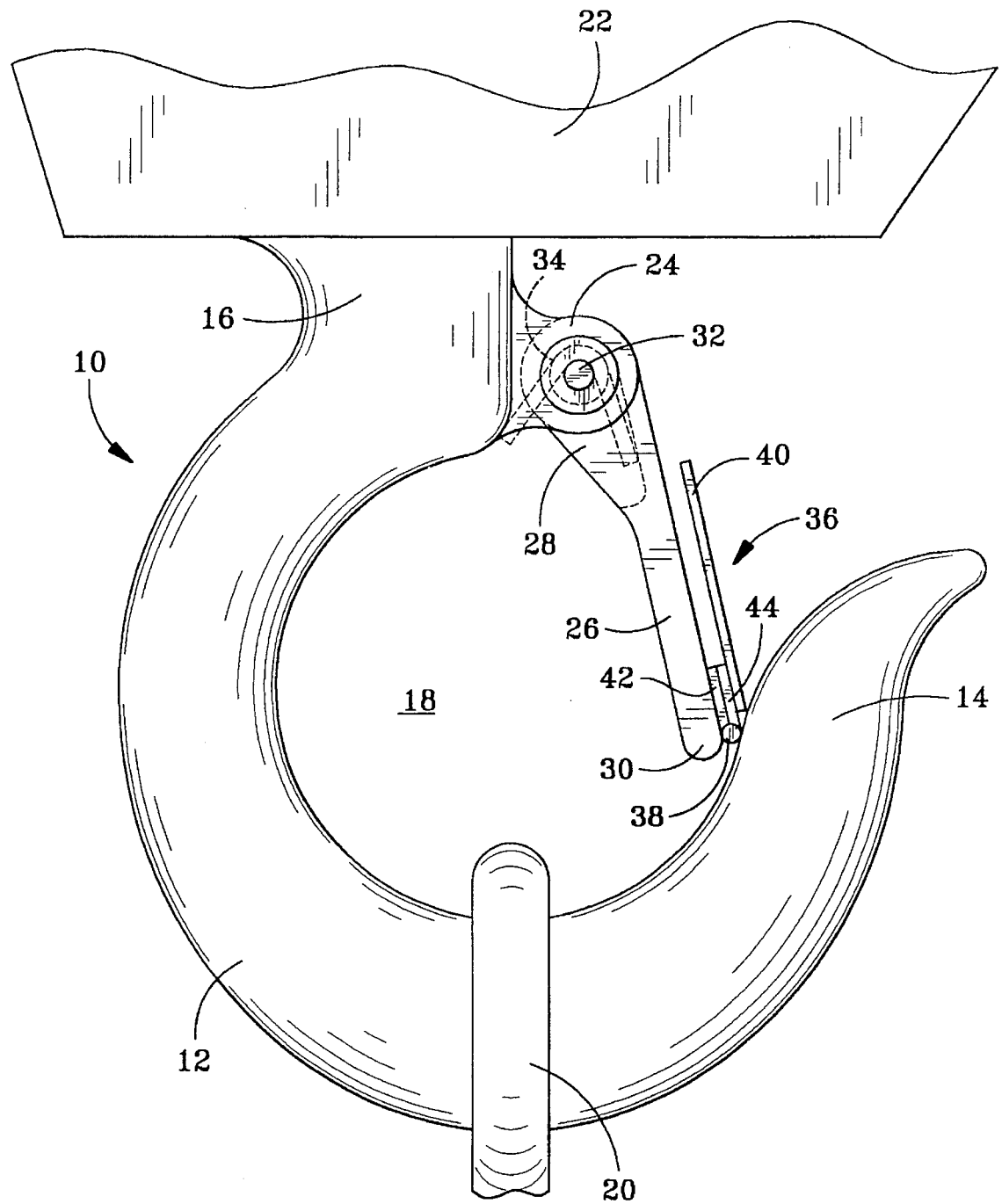
FIG. 1 is a side elevation view of the safety hook of the present invention showing the latch in the closed position.

Referring now to the drawings, wherein similar reference characters designate corresponding parts throughout the several views, FIG. 1 shows a safety hook generally indicated at 10 which includes a hook body 12 having a hook end 14 and a shank end 16. The hook body 12 and hook end 14 define a hook recess 18 that is adapted to receive one end of a conventional load supporting means 20 such as a rope or chain for example. The shank end 16 may be rigidly fixed to a block 22 by a weld or other conventional connection or may be connected to the block 22 so that the hook 10 is movable relative to the block. The block in turn may be mounted to the end of a crane (not shown) or another conventional load supporting machine.

A substantially hollow support member 24 is made integral with the hook at the shank end 16. The support member extends away from the shank end toward the hook end 14 as shown in FIG. 1.

Figure 3:
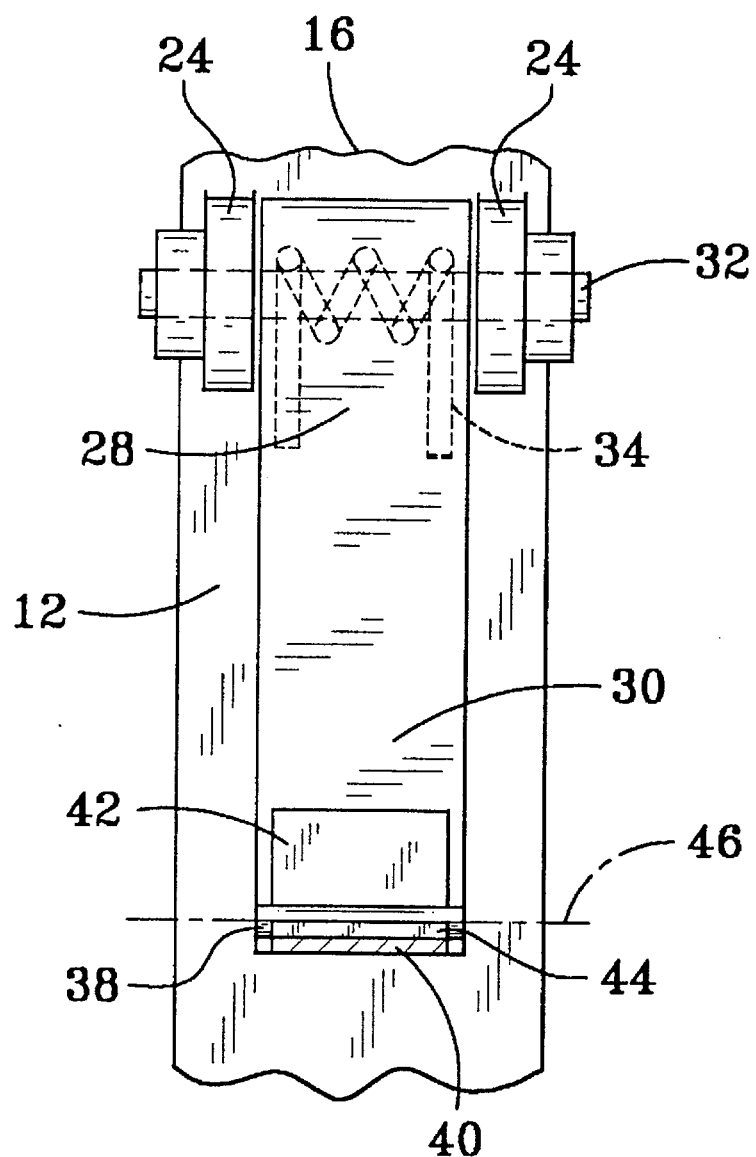
FIG. 3 is a sectional view taken along line 3—3 of FIG. 2.

The hook 10 includes a conventional, spring-biased latch member 26 having a first end 28, and a second end 30. The latch member is pivotably mounted at the first end 28 on a bolt member 32 which in turn is supported at the bolt ends by the support member 24 as shown in FIG. 3. The bolt extends through first end 28 and also through a conventional biasing spring member 34. The conventional spring member may be any suitable spring including a torsion spring or the like.

Figure 2:
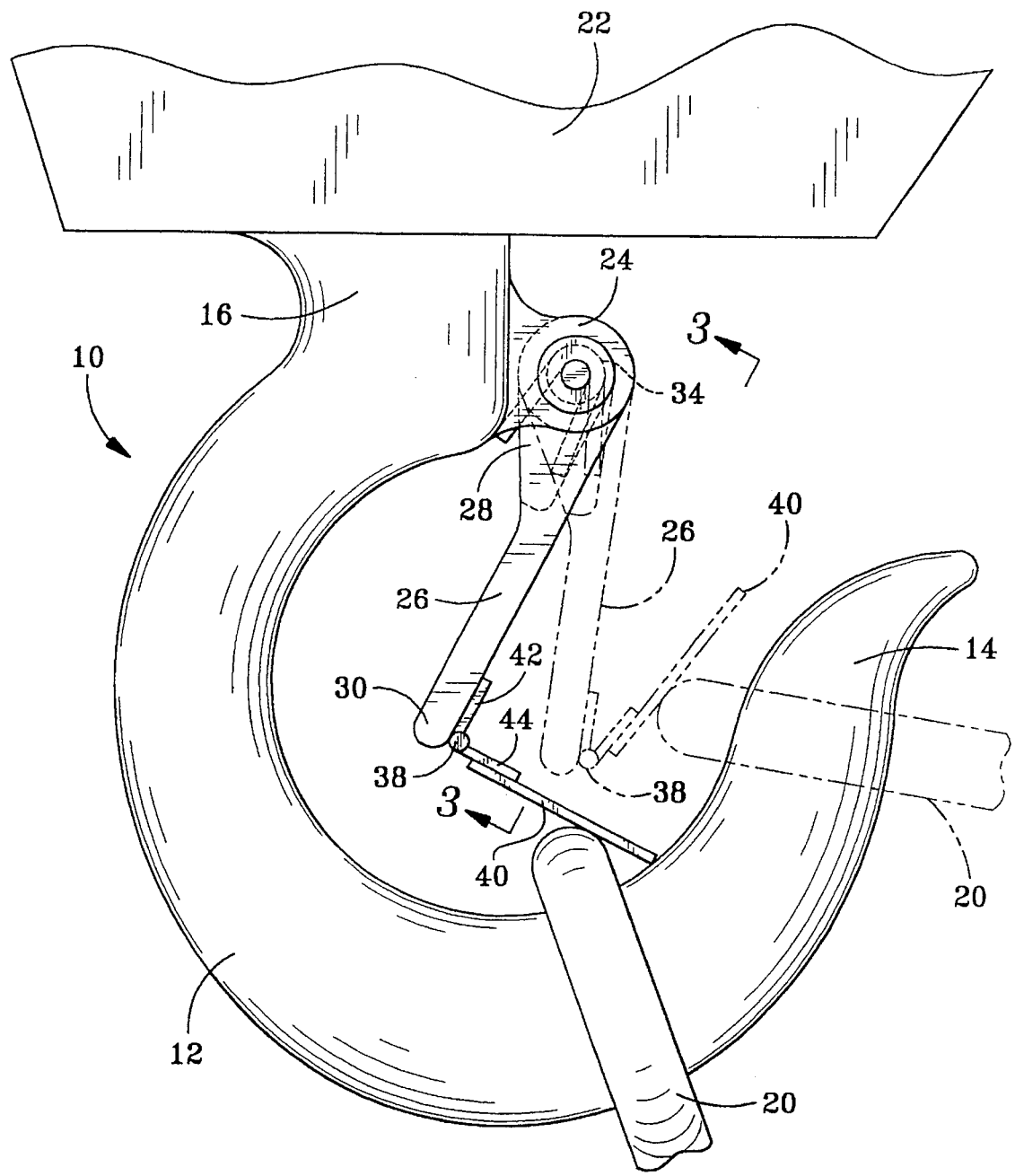
FIG. 2 is a side elevation view like the view of FIG. 1 showing the latch in the open position and also showing the latch between the open and closed positions.

The latch is moveable about member 32, between an open position shown in solid font lines in FIG. 2 and a closed position shown in FIG. 1. When the latch is in the open position, the load supporting means may be taken off the hook and when the latch is in the closed position the load supporting means can not be taken off the hook. The latch is biased to the closed position by the conventional spring member 34 in a manner that is well known in the art. When the latch is in the closed position, the second end 30 is located proximate the hook end 14 and when the latch is in the open position, the second latch end is located away from the hook end and is proximate the hook body 12.

Latch retainer means 36 is mounted on the latch along the length of the latch. As shown in FIGS. 1 and 2, the latch retainer means is located at the second end 30 of the latch 26; however, it is contemplated that the latch retainer means could be located at any location along the length of the latch.

The retainer means includes a hinge 38 having first and second plates 42 and 44, and a retainer member 40 attached to the second plate 44. The hinge 38 is of a conventional design that is well known to one skilled in the art. The first plate 42 is rigidly connected to the latch member 26 at the second latch end 30 by a weld connection or another suitable conventional connection. The second plate is moveable relative to the fixed first plate 42, about an axis 46 generally defined by the hinge.

Retainer member 40 is attached to the second plate 44 by a weld or by suitable conventional fasteners such as rivets or the like. By this connection between plate 44 and member 40, the retainer 40 is moveable with the second plate 44, relative to the first plate 42 and about axis 46.

The retainer member is movable about axis 46 between a non-retaining position shown in FIG. 1 and a retaining position shown in FIG. 2 in solid font where the edge of the free end of the retaining member is engaged with the hook end. The retaining and non-retaining positions are disclosed as being separated by approximately ninety degrees so that the second plate 44 and retainer member 40 are movable approximately ninety degrees relative to the fixed first plate 42. Compare FIGS. 1 and 2. However, it is foreseeable that the invention may be modified so that the retaining and non-retaining positions are separated by greater than or less than ninety degrees and that retainer member 40 and second plate 44 may be displaced a corresponding modified angle relative to plate 42.

A resilient member (not shown) made from rubber plastic or the like, may be added to the edge of the free end of the retainer member to cover the edge and thereby increase the frictional forces between the hook and retainer member present when the retainer member engages the hook in the retaining position.

When the latch is in the closed position shown in FIG. 1, the hinge 38 engages the hook end. The invention may be modified so that the second end engages the hook end when the latch is closed.

Additionally, although the retainer means 36 is disclosed as being welded or otherwise rigidly attached to latch 26, it is contemplated that the retainer means design may be altered so that the retainer means can be removably mounted to the latch. For example, the retainer means may be modified so that it can be joined to the latch by screws, bolts or other removable connection members.

In use, unloaded safety hook 10 is moved to a desired location by a load supporting machine. Initially, the retainer member 40 is in the retracted, non-retaining position shown in FIG. 1 and the latch member is in the closed position.

The free end of the load supporting means 20 is hooked onto hook end 14 and is slid into hook recess 18. As the load supporting means is slid into the recess, the latch 26 is urged out of the closed position by the load supporting means thereby permitting the load supporting means to be deposited into the hook recess.

After the load supporting means is located in the recess, the latch is returned to the closed position by the biasing spring 34.

While a load is being supported by the hook 10, the latch is biased to the closed position shown in FIG. 1 and the retainer member 40 is in the non-retaining position.

When it is necessary to take the rope or chain 20 off the hook, an operator manually moves the latch to the open position shown in solid font in FIG. 2. After the latch is moved to the open position, the retainer member is moved clockwise, about axis 46 until the edge of the free end of the retainer member engages the hook end in the manner shown in the solid line view of FIG. 2. The retainer member keeps the spring biased latch from pivoting back to the closed position while the load supporting means 20 is being taken out of the hook recess 18. This permits the machine operator to use both hands to remove member 20. The member 20 can be removed without help from an additional operator.

As the load supporting means is taken out of the recess 18, the means engages the retainer member 40 as shown in solid font in FIG. 2. By this engagement the retainer member is urged out of the retaining position and is pivoted counterclockwise about axis 46 towards the latch 26. As the retainer member is pivoted towards the latch, the latch member moves proportionally towards the closed position. The relative movement of the latch and retainer member as the member is taken out of the recess, is shown by comparing the solid and phantom views of FIG. 2. As the load supporting means is moved along hook end 14, the member is sandwiched between the hook end and the retainer member, and thus prevents the latch from moving to the closed position and also urges the retainer towards the non-retaining position.

After the load supporting means is removed from the hook, the latch returns to the closed position and the retainer member is in a non-retaining position.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A safety hook, comprising: a hook having a hook end; a latch member having a first end pivotably connected to the hook and a second free end, the latch member pivotable about the first end between a first position where the second end is located away from the hook end and a second position where the second end is located near the hook end; biasing means for biasing the latch member to the second position; and retainer means mounted on the latch member, the retainer means for maintaining the latch member in the first position and wherein the retainer means includes a hinge having a first plate fixed to the latch member and a second plate movable relative to the first plate about an axis, and a retainer member attached to the second plate to be movable with the second plate.

2. The safety hook as claimed in claim 1, wherein the retainer means is located near the second end of the latch member.

3. The safety hook as claimed in claim 1, wherein the first plate is welded to the latch member.

4. A safety hook, comprising: a hook having a hook end; a latch member having a first end pivotably connected to the hook and a second end, the latch member pivotable about the first end between a first position where the second end is located away from the hook end and a second position where the second end is located near the hook end; biasing means for biasing the latch member to the second position; and retainer means mounted on the latch member at the second end, the retainer means for maintaining the latch member in the first position, the retainer means including a hinge having a first plate fixed to the latch member and a second plate movable relative to the first plate about an axis, and a retainer member attached to the second plate to be movable with the second plate.

5. The safety hook as claim 4, wherein the first plate is welded to the latch member.

6. A method for removing a load supporting member from a safety hook, the safety hook including a hook body defining a hook recess, a latch movably mounted to the hook body to be movable relative to the body between an open position which permits the load supporting member to be removed from the hook and a closed position which does not permit removal of the load supporting member from the hook; and a retainer member attached to the latch, said retainer member movable between a retaining position where the latch is maintained in the open position and a non-retaining position where the latch is not maintained in the open position, the method comprising the following steps:

a) moving the latch to the open position;
 b) moving the retainer member to the retaining position; and
 c) moving the load supporting member out of the hook recess so that as the load supporting member is moved out of the recess, the load supporting member engages the retainer member thereby urging the retainer member out of the retaining position and toward the non-retaining position, permitting the latch to return to the closed position.

7. The method as claimed in claim 6 further including the step of maintaining the load supporting member between the retainer member and the hook as the load supporting member is removed form the hook recess.

8. The method as claimed in claim 6 wherein the retainer member includes an edge, wherein method step b) includes pivoting the retainer member relative to the latch and engaging the retainer member edge with the hook body.

9. The method as claimed in claim 6 wherein the latch has a first latch member end, wherein method step a) includes pivoting the latch about the first latch member end.

10. A safety hook for supporting a load supporting member, the safety hook comprising: a hook having a hook end; a latch member having a first end pivotably connected to the hook and a second free end, the latch pivotable about the first end between a first position where the second end is located away from the hook end and a second position where the second end is located near the hook end; biasing means for biasing the latch member to the second position; and retainer means mounted on the latch member, the retainer means for maintaining the latch member in the first position, said retaining means having a support member adapted to engage the hook end when the latch is in the first position and also adapted to be moved out of engagement with the hook when the load supporting member is removed from the hook.

11. The safety hook as claimed in claim 10 wherein the retaining means includes a hinge, said hinge comprised of a first member and of a second member, said first member adapted to be movable relative to said second member, said support member joined to said first member.

12. The safety hook as claimed in claim 11 wherein said second member is fixed to said latch member.

* * * * *